United States Patent
Natanzon et al.

(10) Patent No.: US 10,146,436 B1
(45) Date of Patent: Dec. 4, 2018

(54) EFFICIENTLY STORING LOW PRIORITY DATA IN HIGH PRIORITY STORAGE DEVICES

(71) Applicant: EMC Corporation, Hopkinton, MA (US)

(72) Inventors: Assaf Natanzon, Tel Aviv (IL); Arieh Don, Newton, MA (US); Gabi Benhanokh, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 44 days.

(21) Appl. No.: 15/196,609

(22) Filed: Jun. 29, 2016

(51) Int. Cl.
 *G06F 3/06* (2006.01)
(52) U.S. Cl.
 CPC .......... *G06F 3/0608* (2013.01); *G06F 3/0641* (2013.01); *G06F 3/0689* (2013.01)
(58) Field of Classification Search
 CPC ............ G06F 3/00; G06F 3/06–3/0608; G06F 3/061–3/0641; G06F 3/0643–3/0689; G06F 11/08–11/2097; G06F 17/30–17/30997; G06F 2212/00–2212/7211
 See application file for complete search history.

(56) References Cited

U.S. PATENT DOCUMENTS

| | | | | | |
|---|---|---|---|---|---|
| 7,567,188 | B1 * | 7/2009 | Anglin | .................. | G06F 3/0608 341/63 |
| 7,631,155 | B1 * | 12/2009 | Bono | .................... | G06F 3/0608 707/999.202 |
| 8,429,307 | B1 * | 4/2013 | Faibish | ................. | G06F 3/0605 710/1 |
| 8,527,544 | B1 * | 9/2013 | Colgrove | .............. | G06F 3/0608 707/791 |
| 8,549,518 | B1 * | 10/2013 | Aron | .................... | G06F 9/45558 718/1 |
| 8,566,546 | B1 * | 10/2013 | Marshak | ............... | G06F 3/0604 711/112 |
| 8,818,951 | B1 * | 8/2014 | Muntz | ............... | G06F 17/30088 707/639 |

(Continued)

OTHER PUBLICATIONS

Storage-efficient data replica number computation for multi-level priority data in distributed storage systems; Cai et al; 43rd Annual IEEE/IFIP Conference on Dependable Systems and Networks Workshop; Jun. 24-27, 2013 (Year: 2013).*

(Continued)

*Primary Examiner* — Daniel C Chappell
(74) *Attorney, Agent, or Firm* — Dergosits & Noah LLP; Todd A. Noah

(57) ABSTRACT

Efficiently storing low priority data in high priority storage devices is described. A system receives a request from an application to store a data chunk received from the application. The system determines a priority of the application. The system executes a write command to store the data chunk to a high priority storage device. If the application is low priority and the identifier of the received data chunk is a duplicate of any of the identifiers of the data chunks that were previously stored in the high priority storage device, the system stores, into the high priority storage device, the received data chunk as a low priority reference to a data chunk that was previously stored in the high priority storage device.

20 Claims, 7 Drawing Sheets

(56) References Cited

U.S. PATENT DOCUMENTS

| | | | |
|---|---|---|---|
| 8,838,887 B1* | 9/2014 | Burke | G06F 3/0611 |
| | | | 711/112 |
| 8,943,032 B1* | 1/2015 | Xu | G06F 17/30079 |
| | | | 707/661 |
| 8,949,208 B1* | 2/2015 | Xu | G06F 3/0641 |
| | | | 707/661 |
| 9,235,588 B1* | 1/2016 | Vaikar | G06F 17/3015 |
| 9,323,655 B1* | 4/2016 | Sahin | G06F 12/023 |
| 10,042,704 B2* | 8/2018 | Baptist | H04L 63/108 |
| 2009/0157756 A1* | 6/2009 | Sanvido | G06F 3/061 |
| 2013/0297873 A1* | 11/2013 | Hyde, II | G06F 3/0611 |
| | | | 711/117 |
| 2014/0310455 A1* | 10/2014 | Baldwin | G06F 3/0641 |
| | | | 711/114 |

OTHER PUBLICATIONS

Live Data Migration for Reducing Sla Violations in Multi-tiered Storage Systems; Tai et al.; 2014 IEEE International Conference on Cloud Engineering; Mar. 11-14, 2014 (Year: 2014).*

Space savings and design considerations in variable length deduplication; Yasa et al.; ACM SIGOPS Operating Systems Review, vol. 46, iss. 3; Dec. 2012; pp. 57-64 (Year: 2012).*

Improving Virtualized Storage Performance with Sky; Arulraj et al.; Proceedings of the 13th ACM SIGPLAN/SIGOPS International Conference on Virtual Execution Environments; Apr. 8-9, 2017 (Year: 2017).*

* cited by examiner

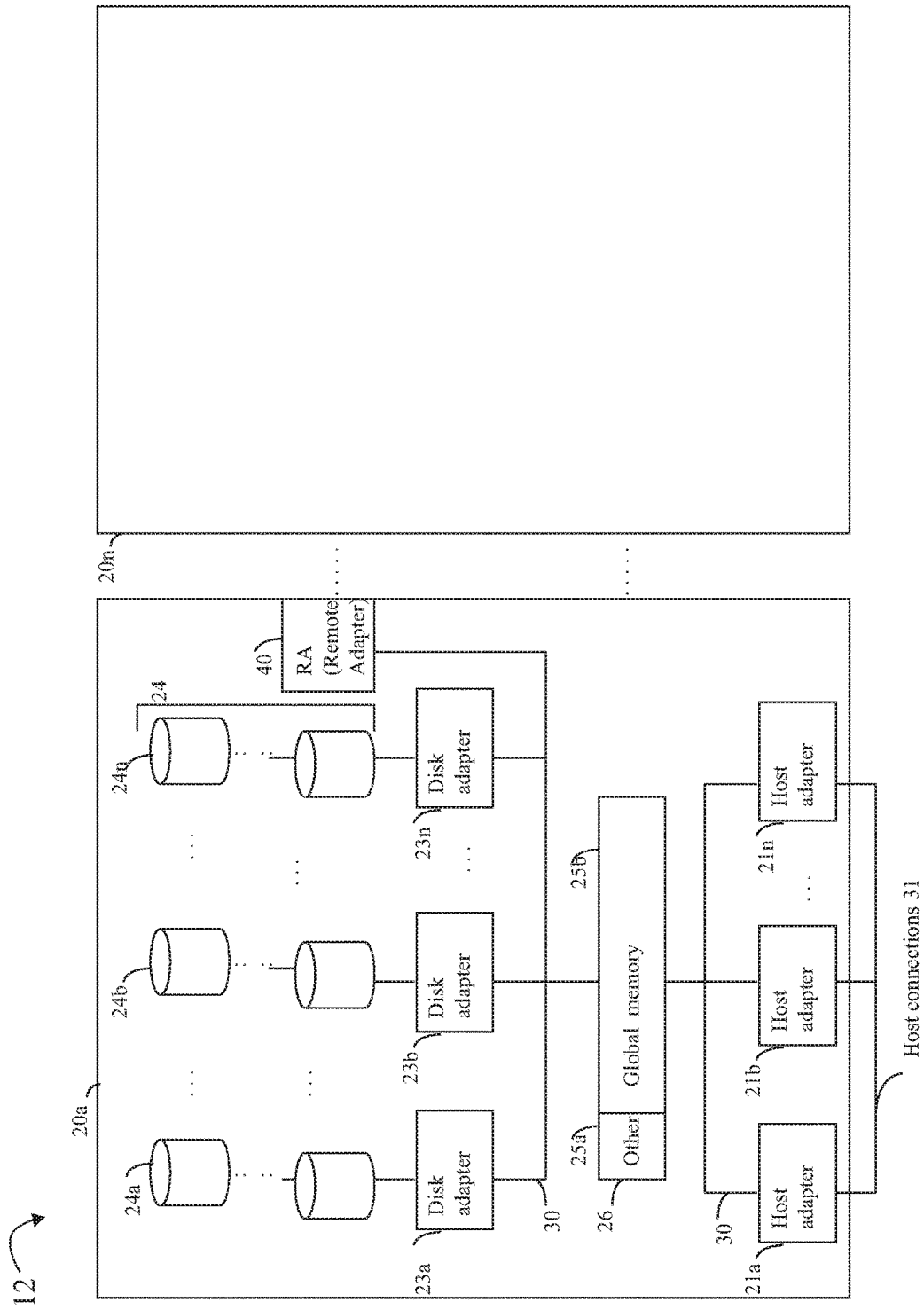

EFFICIENTLY STORING LOW PRIORITY DATA IN HIGH PRIORITY STORAGE DEVICES

BACKGROUND

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

Data deduplication is a specialized data compression technique used to improve storage utilization by eliminating duplicate copies of data. In a deduplication process, a data storage system identifies a received chunk of data, such as by executing a hash function on the chunk to generate a hash value that identifies the chunk, stores the chunk, and creates a reference counter for the chunk. When the data storage system receives a subsequent chunk to be stored, the data storage system identifies the subsequent chunk, such as by generating a hash value for the subsequent chunk, and compares the identifier for the subsequent chunk to the identifiers for the previously stored chunks. Whenever a match of identifiers occurs, the data storage system stores the new yet redundant chunk as a small reference that points to the previously stored chunk that has the matching identifier, and increments the reference counter for this previously stored chunk. If the data storage system receives a request to delete this chunk, the data storage system decrements the reference counter for this chunk. If the reference count for a chunk is decremented to zero, the data storage system deletes the chunk and the reference counter for the chunk because the chunk no longer needs to be stored.

For example, a host executes a write command to store data XXX to disk 1 of a data storage device, and the data storage device generates the hash value of H1 for the data XXX, determines that the hash value H1 is not already stored in its hash table, adds the hash value H1 to its hash table, creates a reference counter for the hash value H1, sets the reference counter for the hash value H1 to 1, and stores the data XXX to disk 1. Then the host executes a write command to store data YYY to disk 1 of the data storage device, and the data storage device generates the hash value of H2 for the data YYY, determines that the hash value H2 is not already stored in its hash table, adds the hash value H2 to its hash table, creates a reference counter for the hash value H2, sets the reference counter for the hash value H2 to 1, and stores the data YYY to disk 1. Next, the host executes a write command to store data XXX to disk 4 of the data storage device, and the data storage device generates the hash value of H1 for the data XXX, determines that the hash value H1 is already stored in its hash table, increments the reference counter for the hash value H1 to 2, and stores the data XXX to disk 4 as a small reference to the previously stored data XXX. Subsequently, the host executes a write command to store data ZZZ to disk 4 of the data storage device, and the data storage device generates the hash value of H3 for the data ZZZ, determines that the hash value H3 is not already stored in its hash table, adds the hash value H3 to its hash table, creates a reference counter for the hash value H3, sets the reference counter for the hash value H3 to 1, and stores the data ZZZ to disk 4. Lastly, the data storage system receives a request to delete disk 4, determines that disk 4 stores data that corresponds to the hash values H1 and H3, decrements the reference counter for the hash value H1 from 2 to 1, decrements the reference counter for the hash value H3 from 1 to 0, deletes the reference counter for the hash value H3, deletes the hash value H3 from its hash table, and deletes disk 4.

Storage-based data deduplication processes large volumes of data and identifies relatively large chunks of data—such as an entire file or a large section of a file—that are identical, in order to store only one copy of the chunk of data. For example a typical email system might contain 100 instances of the same 1 megabyte file attachment. Without data deduplication, all 100 instances of this attachment are stored when the email system is backed up, thereby requiring 100 megabytes of storage space for this attachment. With data deduplication, only the first instance of this attachment is actually stored, and the subsequent instances are referenced back to the previously stored instance, resulting in a deduplication ratio of roughly 100 to 1 for this attachment.

BRIEF DESCRIPTION OF THE DRAWINGS

FIG. 2A is an example of an embodiment of a data storage system;

DETAILED DESCRIPTION

Embodiments herein enable efficiently storing low priority data in high priority storage devices. A system receives a request from an application to store a data chunk received from the application. The system determines a priority of the application. The system executes a write command to store the data chunk to a high priority storage device. If the application is low priority and if the identifier of the received data chunk is a duplicate of any of the identifiers of the data chunks that were previously stored in the high priority storage device, the system stores, into the high priority storage device, the received data chunk as a low priority reference to a matching data chunk that was already stored in the high priority storage device.

For example, a host receives a request from an email application to store data MMM that the host received from the email application. The host determines whether the email application is a high priority application or a low priority application. The host executes a write command to store the data MMM to a flash-based storage device in a data storage system. If the email application is low priority and if the hash value of the data MMM matches any of hash values for the data chunks that were previously stored in any of the data storage system's flash-based storage devices, the data storage system stores, into the flash-based storage device, the data MMM as a low priority reference to the previously stored data MMM that was previously stored in one of the data storage system's flash-based storage devices. Storing this relatively small reference to the data MMM previously stored to one of the data storage system's flash-based storage devices conserves a significant amount of storage space on the data storage system's low priority storage devices. Furthermore, if the host receives a subsequent request to retrieve this low priority data MMM, the host can more quickly retrieve this requested low priority data MMM from the flash-based storage device using the reference, which is stored in one of the data storage system's flash-based storage devices, to the previously stored data MMM that was previously stored in one of the data storage system's flash-based storage devices, when compared to the relatively slow retrieval time that would have been required for the host to retrieve this low priority data MMM from a low priority storage device.

Figure 1:
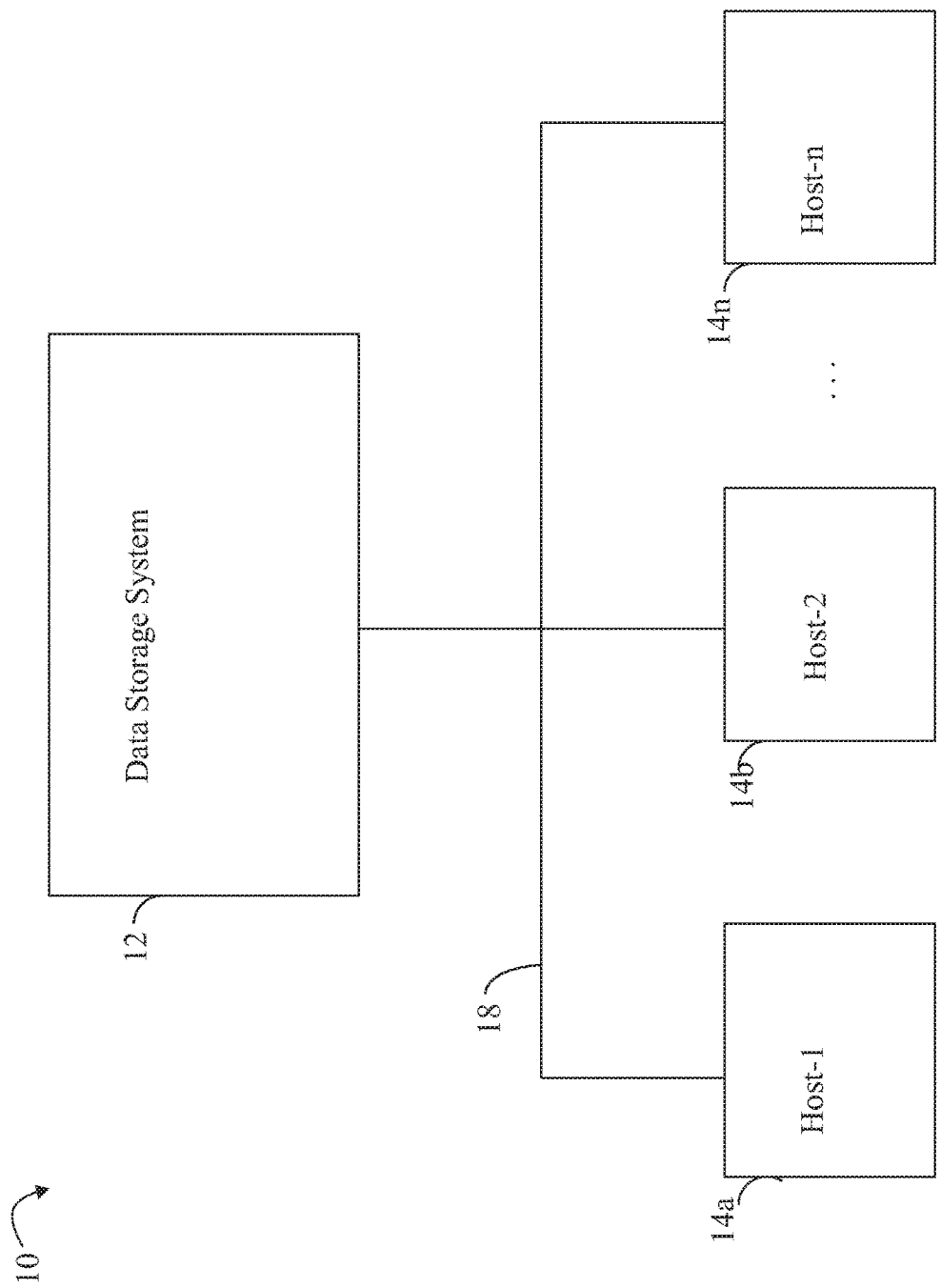
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n. In this arrangement, each of the n groupings of disks may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk controller. The DA may performed operations such as reading data from, and writing data to, the physical devices (e.g., physical storage devices also referred to as PDs) which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs, RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers.

The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
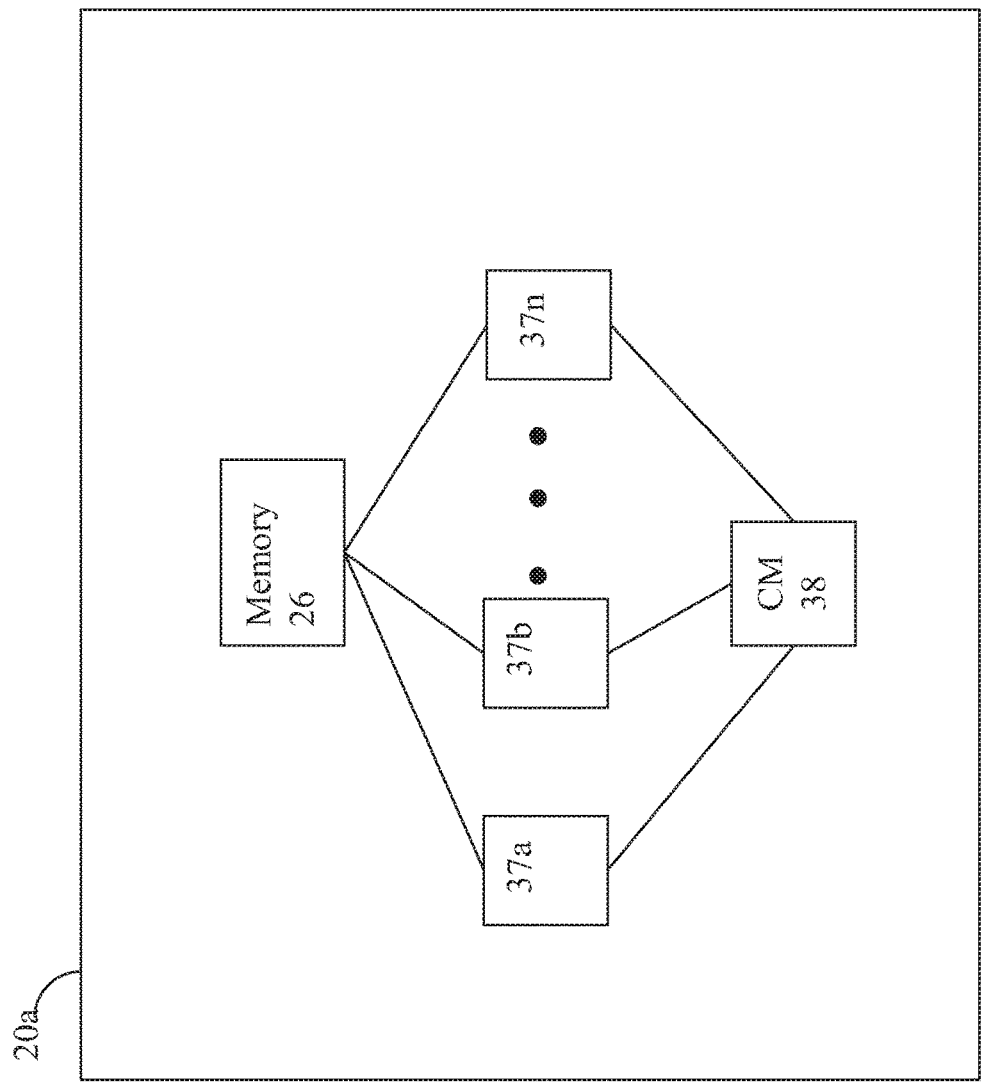
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

An embodiment in accordance with techniques herein may provide one or more data services or facilities such as related to local replication, remote replication, data storage optimization, and the like. For example, a snapshot facility may be used in an embodiment in accordance with techniques herein. A snapshot may be characterized as a point in time logical image of data. In connection with LUNs, software of a data storage system may provide one or more data replication services or facilities whereby a snapshot is one such facility that may be used to create point in time snapshot of production data for non-disruptive backup. A snapshot may be made with respect to a source LUN thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software, for example, to copy the original data prior to changes into another area of storage. With respect to COFW techniques, the COFW occurs only once for each data block modified on the source LUN. Since only changed data blocks of the source LUN are retained rather than make a complete copy of the source LUN, the storage capacity required to implement snapshots may be considerably less than that of the source LUN. Though a LUN snapshot may be presented to a user as a separate LUN along with the current source LUN, a snapshot of a LUN is a virtual point in time copy and requires access to the unchanged data in the source LUN. Therefore failures affecting the source LUN also affect the snapshot of the LUN. Snapshots of a LUN may be contrasted, for example, bit-for-bit replica data copies of a source LUN. Snapshots may be made of a source LUN on demand, according to a schedule, such as daily or at other predefined times, and the like.

In connection with the foregoing, COFW is only one example of technology that may be used in connection with snapshots. More generally, any suitable technique may be used in connection with snapshot creation and techniques described herein. As another example, redirect on Write (ROW) is another technique that may be used in connection with a snapshot implementation, such as in connection with EMC®VNX™ Snapshots. With ROW, after a snapshot is taken, new writes to the primary LUN are redirected (written) to a new location within a storage pool.

An embodiment in accordance with techniques herein may provide for remote replication such providing continuous automated replication. The RA described above may be a component used with the Symmetrix® Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One of the hosts, such as host 14a of FIG. 1, may issue a command, such as to write data to a device R1 of data storage system 12. In some instances, it may be desirable to copy data from the storage device R1 to another second storage device, such as an R2 device provided in another remote data storage system at a different location (not illustrated) so that if a disaster occurs that renders R1 inoperable, the host (or another host) may resume operation using the data of R2 of the remote data storage system. Such a capability is provided, for example, by the SRDF® products provided by EMC Corporation of Hopkinton, Mass. Data storage device communication between Symmetrix® data storage systems using SRDF® is described, for example, in U.S. Pat. Nos. 5,742,792, 5,544,347, 7,054,883, and 8,335,899, all of which are incorporated by reference herein in their entirety. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 14a interacts directly with the device R1 of data storage system 12, but any data changes made are automatically provided to the R2 device of a remote data storage system (not illustrated) using SRDF®. In operation, the host 14a may read and write data using the R1 volume in the data storage system 12, and SRDF® may handle the automatic copying and updating of data from R1 to R2 in a remote data storage system.

An embodiment in accordance with techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first (primary) and second (remote) data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. With synchronous SRDF®, a host cannot proceed to the next I/O until a synchronous SRDF® I/O has completed.

An embodiment in accordance with techniques herein may also support creating a complete physical copy of data storage LUN or other storage entity. The complete physical copy may be a bit for bit replica of the LUN at a point in time.

The foregoing are a few examples of such data services and facilities that may be used in an embodiment in accordance with techniques herein.

Figure 3:
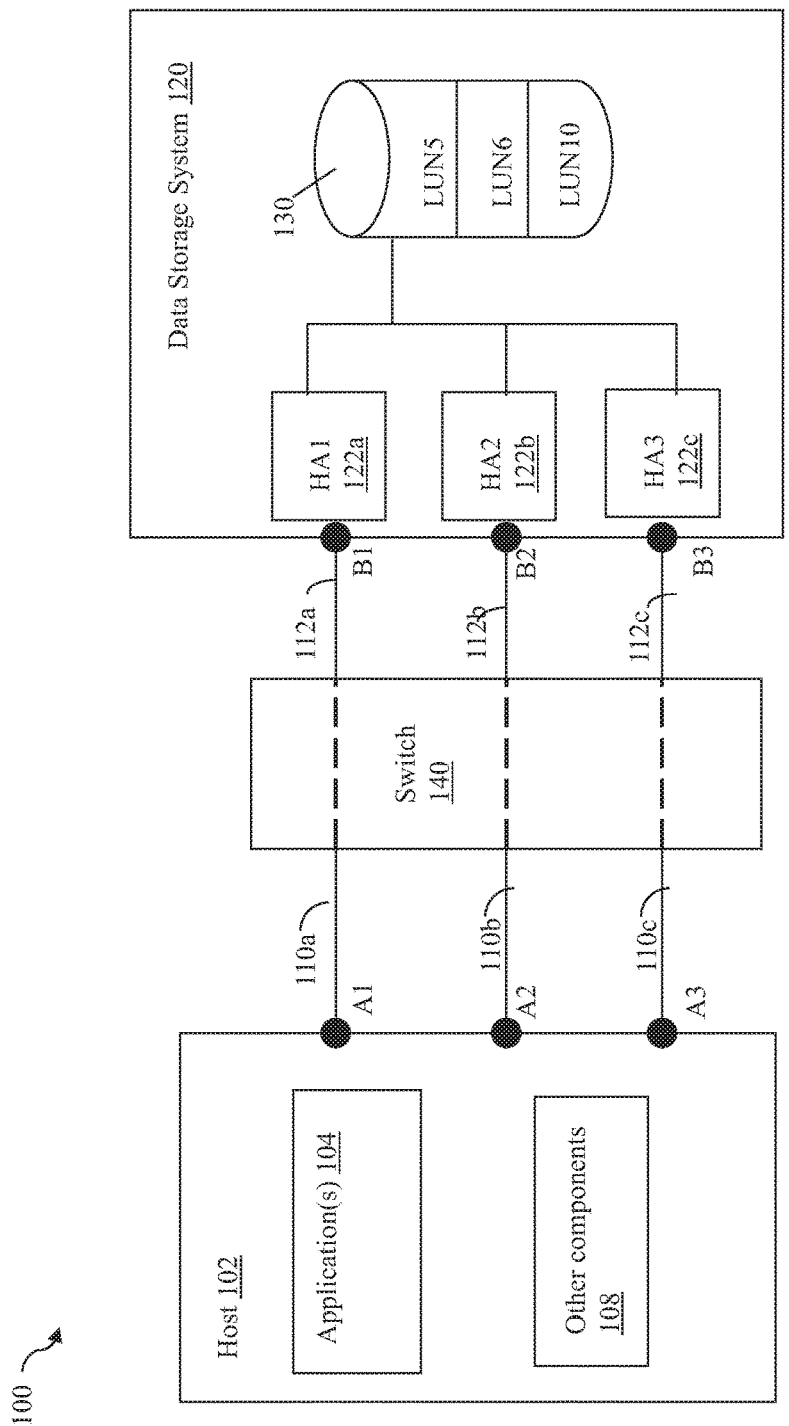
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical storage device of the data storage system 120, such as a rotating disk drive, flash-based storage device, and the like, where the physical storage device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, each of the LUNs may be configured to have storage provisioned from multiple different physical devices rather than a single physical device, and multiple hosts having multiple applications executing thereon may communicate with the data storage system.

The host 102 may include one or more applications 104 and other components 108 whereby element 108 may include, for example, one or more other device drivers and other code. An I/O operation from the application 104 may be communicated to the data storage system 120 using one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over one or more physical paths. As such, each of the I/O operations may be forwarded from the application 104 to the data storage system 120 over one of the possible multiple paths.

The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
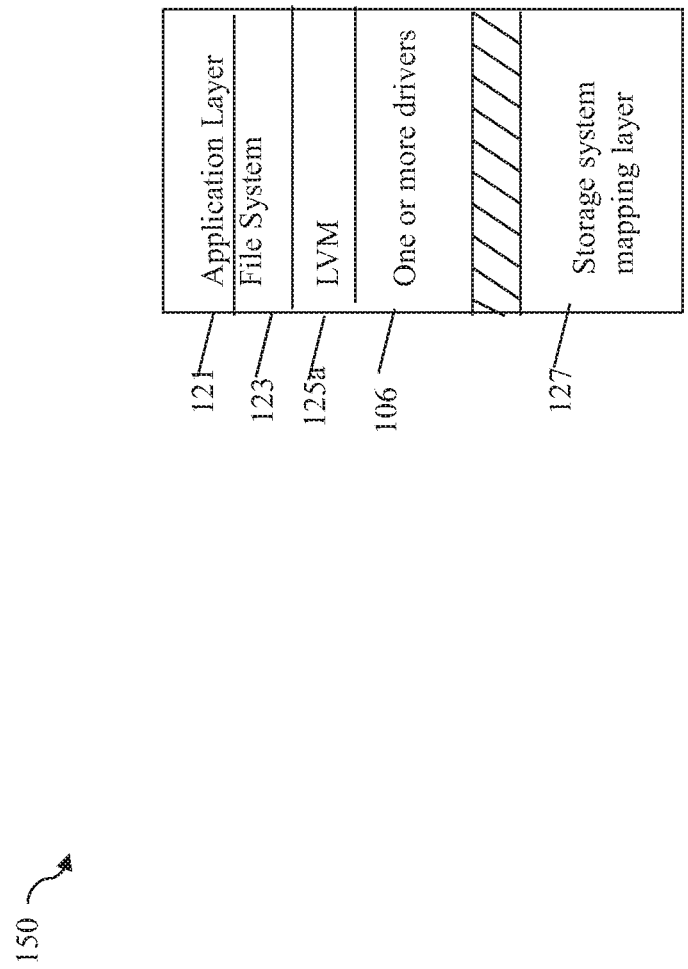
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with performing a data operation request issued by a host to a data storage system such as illustrated in FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be one or more drivers 106 which handle processing of the I/O received from layer 125a. The one or more drivers represented by 106 may include, for example, a SCSI driver (e.g., performs processing for sending requests and receiving responses in accordance with the SCSI standard), a hardware driver (e.g., a driver for an HBA of the host which sends commands or requests to the data storage system and also receives responses and other communications from the data storage system), and the like. Generally, one or more layers between the application layer 121 and the one or more drivers 106 may provide for mapping a LUN (such as used in connection with block-based storage) presented by the data storage system to the host to another logical data storage entity, such as a file, that may be used by the application layer 123.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the drivers 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

Figure 5:
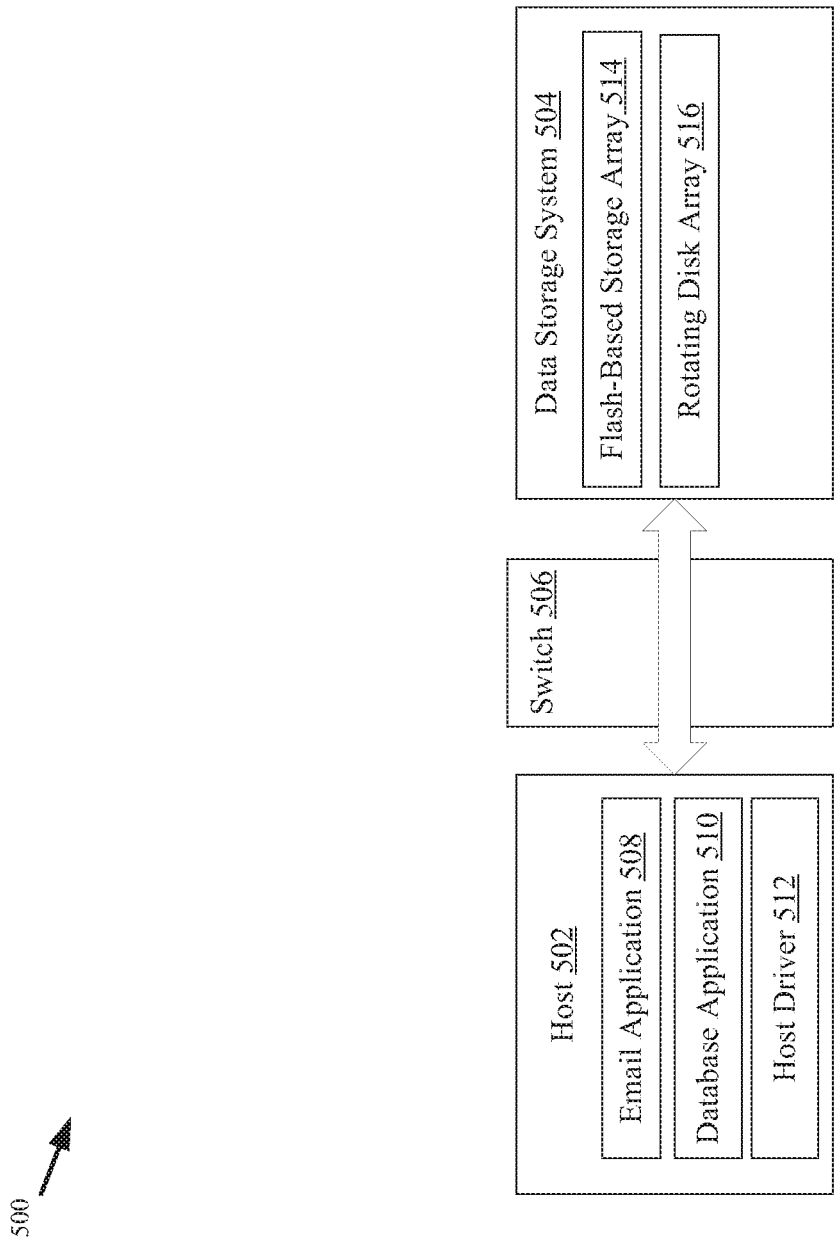
FIG. 5 is a block diagram of an example system for efficiently storing low priority data in high priority storage devices, under an embodiment.

FIG. 5 is an example system for efficiently storing low priority data in high priority storage devices, under an embodiment. The system 500 includes a host 502 that communicates with a data storage system 504 via a switch 506. The host 502 includes an email application 508 that may be a low priority application and a database application 510 that may be a high priority application. The host 502 also includes a host driver 512, which may be a multi-pathing driver, to handle processing of I/O. The data storage system 504 includes a high priority storage array of high priority storage devices, which may be a flash-based storage array 514 of flash-based storage devices that provide relatively fast access to data, and a low priority storage device, which may be a rotating disk drive array 516 of rotating disk devices that provides relatively slow access to data. The flash-based storage array 514 may be referred to as an all flash array. Although a high priority storage device is described as having data deduplication capabilities, and a low priority storage device is described as not having data deduplication capabilities, in some embodiments a low priority storage device may also have data deduplication capabilities. However, a low priority storage device's data deduplication capabilities would be relatively slower than a high priority storage device's data deduplication capabilities due to a low priority storage device having relatively slower access times when compared to a high priority storage device's access times.

Each of the applications 508 and 510 are identified as a high priority application or a low priority application, such that the data received from each of the application 508 and 510 is processed as high priority data or low priority data, depending on the priority of the application that sent the data. The host 502 stores data chunks received from the applications 508 and 510 that are identified as a high priority application as high priority data chunks on the flash-based storage array 514, and stores hash values for the high priority data chunks stored on the flash-based storage array 514. In contrast to prior art systems that store data chunks received from a low priority application exclusively to a low priority storage device, the host 502 can store data chunks received from the application 508 and 510 that are identified as low priority application as either low priority data chunks on the rotating disk array 516 and/or as low priority data chunks on the flash-based storage array 514. Therefore, the data storage system 504 maintains two reference counters for each of the hash values, which correspond to the data chunks stored on the flash-based storage array 514. The data storage system 504 maintains a high priority reference counter for a hash value that counts the number of times that the flash-based storage array 514 has stored a corresponding data chunk for a high priority application, and a low priority reference counter for the hash value that counts the number of times that the flash-based storage array 514 has stored a corresponding data chunk for a low priority application.

The system 500 receives requests from applications to store data chunks received from the applications. For example, the host driver 512 receives a request from the database application 510 to store the data XXX that the host driver 512 received from the database application 510. In another example, the host driver 512 receives a request from the email application 508 to store the data MMM that the host driver 512 received from the email application 508. Having received a storage request from an application, the system 500 determines whether the requesting application is a high priority application or a low priority application. For example, the host driver 512 determines that the database application 510 is a high priority application. In another example, the host driver 512 determines that the email application 508 is a low priority application. Having determined the requesting application's priority, the system 500 executes a write command to store a received data chunk to a high priority storage device. For example, the host driver 512 executes a write command to store the data XXX from the high priority database application to one of the flash-based storage devices in the flash-based storage array 514. In another example, the host driver 512 executes a write command to store the data MMM from the low priority email application to one of the flash-based storage devices in the flash-based storage array 514, even though the data MMM is low priority data and the flash-based storage array 514 includes only high priority storage devices.

Having received a write command to store a received data chunk to a high priority storage device, the system 500 determines whether the identifier of a received data chunk is a duplicate of any of the identifiers of the data chunks that are already stored in a high priority storage device. For example, the data storage system 504 determines whether a hash value H1 of the data XXX received from the high priority database application 510 matches any of the hash values of the data chunks that are already stored in the flash-based storage array 514. If the identifier of a data chunk received from a high priority application is a duplicate of any of the identifiers of the data chunks that are already stored in any of the high priority storage devices, the system 500 stores, into one of the high priority storage devices, the data chunk received from the high priority database application as a high priority reference to the duplicate data chunk that is already stored in one of the high priority storage devices. A reference, whether a high priority reference or a low priority reference, may be a pointer to data that is already stored in one of the high priority devices or the hash value of the received data that is a duplicate of data that is already stored in one of the high priority devices. For example, if the hash value H1 of the data XXX received from the high priority database application 510 matches one of the hash values of the data chunks that are already stored in the flash-based storage array 514, the data storage system 504 stores, into the flash-based storage array 514, the received data XXX as a high priority reference to the previously stored data XXX that was already stored in the flash-based storage array 514. Then the data storage system 504 increments the high priority reference count for the hash value H1 for the previously stored data XXX. If the identifier of a data chunk received from a high priority application is a not duplicate of any of the identifiers of the data chunks that are already stored in any of the high priority storage devices, the system 500 can store the received data chunk into one of the high priority storage devices. For example, if the hash value H1 of the data XXX received from the high priority database application 510 did not match any of the hash values of the data chunks that are already stored in the flash-based storage array 514, the data storage system 504 stores the received data XXX into one of the flash-based storage devices in the flash-based storage array 514.

In another example, the data storage system 504 determines whether a hash value H4 of the data MMM received from the low priority email application 508 matches any of the hash values of the data chunks that are already stored in any of the flash-based storage devices in the flash-based storage array 514. If the identifier of a data chunk received from a low priority application is a duplicate of any of the identifiers of the data chunks that are already stored in any of the high priority storage devices, the system 500 stores, into one of the high priority storage devices, the received data chunk as a low priority reference to the duplicate data chunk that was already stored in one of the high priority storage devices. For example, if the hash value H4 of the data MMM received from the low priority email application 508 matches one of the hash values of the data chunks that are already stored in any of the flash-based storage devices in the flash-based storage array 514, then the data storage system 504 stores, into one of the flash-based storage devices in the flash-based storage array 514, the received data MMM as a low priority reference to the previously stored data MMM that was already stored in one of the flash-based storage devices in the flash-based storage array 514. Then the data storage system 504 increments the low priority reference count for the hash value H4 for the previously stored data MMM. When a data chunk is received from a low priority application and is a duplicate of a data chunk already stored by a high priority storage device, the data storage system 504 can store this low priority data to one of the high priority storage devices because the cost is negligible to store a relatively small reference to a data chunk previously stored to the high priority storage device. Storing this relatively small reference to the data chunk previously stored to the high priority storage device conserves a significant amount of storage space on the low priority storage device. Furthermore, if the host 502 receives a subsequent request to retrieve this low priority data, the host 502 can more quickly retrieve this requested low priority data from a high priority storage device using the relatively small reference, when compared to the relatively slow retrieval time that would have been required for the host 502 to retrieve this low priority data from a low priority storage device.

If the identifier of a data chunk received from a low priority application is a not duplicate of any of the identifiers of the data chunks that are already stored in any of the high priority storage devices, the system 500 can store the received data chunk into a low priority storage device. For example, if the hash value H4 of the data MMM received from the low priority email application 508 did not match any of the hash values of the high priority data chunks that are already stored in the flash-based storage array 514, then the data storage system 504 responds with a chk-cond message that rejects the write request, the host driver 512 executes a write command to store the data MMM to the rotating disk array 516, and the data storage system 504 stores the received data MMM into the rotating disk array 516.

After the host 502 stores data to the flash-based storage array 514 and the rotating disk storage array 516, the host may need to retrieve the stored data from the flash-based storage array 514 and the rotating disk storage array 516. The host 502 may initially request data from the flash-based storage array 514, and only request data from the rotating disk storage array 516 if the flash-based storage array 514 responds by indicating that the flash-based storage array 514 does not store the requested data. Alternatively, the host 502 may maintain a bitmap that records which data is stored to the flash-based storage array 514 and which data is stored to the rotating disk storage array 516, and reference the bitmap when retrieving data to determine whether the data to be retrieved should be requested from the flash-based storage array 514 or the rotating disk storage array 516.

As part of maintaining the reference counters, the system 500 can determine whether any high priority reference count is reduced to zero while the corresponding low priority reference count is non-zero, which would indicate that a specific data chunk is now being stored on a high priority storage device exclusively for at least one low priority application. For example, the data storage system 504 determines if the high priority count of references to the data MMM that was already stored in one of the flash-based storage devices in the flash-based storage array 514 has been reduced to zero. If a high priority reference count is reduced to zero, and the corresponding low priority reference count is also zero, then the system 500 can delete the corresponding data chunk from the high priority storage device. For example, the data storage system 504 deletes the data MMM from the flash-based storage array 514 because both of the reference counters for the hash H4 of the data MMM have been reduced to zero, indicating that the data MMM is no longer being stored on behalf of any application.

If a high priority reference count is reduced to zero, and the corresponding low priority reference count is not zero, then the system 500 can create a copy of the corresponding data chunk in a low priority storage device, in preparation for deleting the corresponding data chunk from a high priority storage device. For example, if the high priority reference count for the data MMM is reduced to zero and the high priority reference count for the data MMM is 2, the data storage system 504 stores the data MMM, which is already stored in one of the flash-based storage devices in the flash-based storage array 514, to the rotating disk array 516. If the system 500 copied a data chunk which is already stored in a high priority storage device into a low priority storage device, the system 500 can delete the data chunk from the high priority storage device. For example, the data storage system 504 deletes the data MMM from the flash-based storage array 514 because the data storage system 504 already moved the data MMM to the rotating disk array 516. If a low priority reference count is reduced to zero, but the corresponding high priority reference count is not zero, then the system 500 does not delete the corresponding data chunk from a high priority storage device because the corresponding data chunk is still being stored on the high priority storage device on behalf of at least one high priority application. In this manner, the system 500 can store a low priority data chunk at a negligible cost reference in a high priority storage device provided that the data chunk was already stored to the high priority storage device on behalf of a high priority application. Storing this relatively small reference to the data chunk previously stored to a high priority storage device conserves a significant amount of storage space on a low priority storage device. Furthermore, the system 500 can provide faster access to the low priority data chunk, and relocate the low priority data chunk to a low priority storage device once the data chunk is no longer stored to the high priority storage device on behalf of any high priority application.

Figure 6:
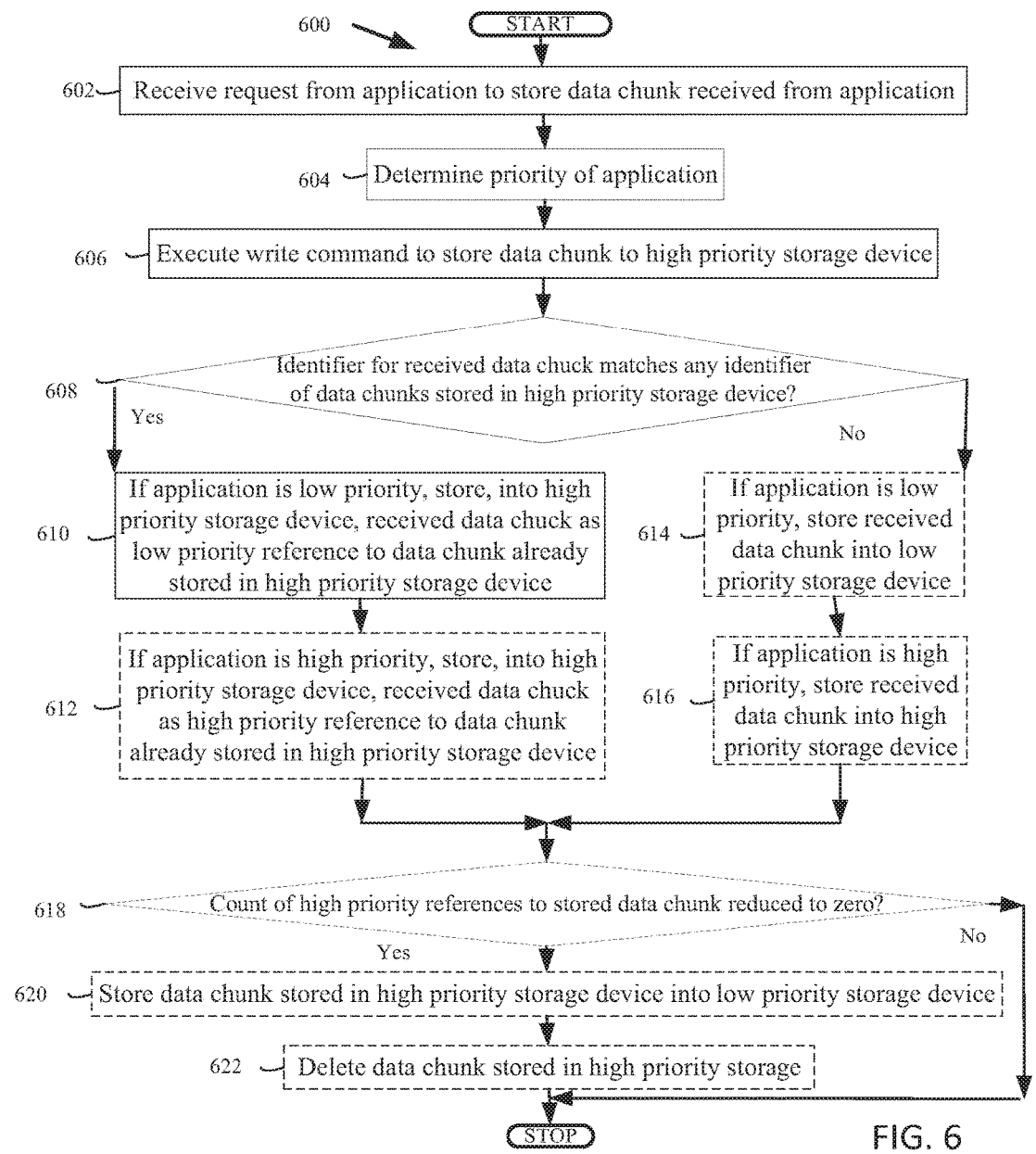
FIG. 6 is a flowchart that illustrates a method of efficiently storing low priority data in high priority storage devices, under an embodiment.

FIG. 6 is a flowchart that illustrates a method for efficiently storing low priority data in high priority storage devices, under an embodiment. Flowchart 600 illustrates method acts as flowchart blocks for certain steps involved in and/or between the host 502 and/or the data storage system 504 of FIG. 5.

The system 500 receives a request from an application to store a data chunk received from the application, block 602. For example, the host driver 512 receives a request from the email application 508 to store the data MMM that the host driver 512 received from the email application 508. In another example, the host driver 512 receives a request from the database application 510 to store the data XXX that the host driver 512 received from the database application 510.

Having received a storage request from an application, the host 502 determines a priority of the application, block 604. For example, the host driver 512 determines that the email application 508 is a low priority application. In another example, the host driver 512 determines that the database application 510 is a high priority application.

Having determined a priority of a requesting application, the system 500 executes a write command to store a data chunk to a high priority storage device, block 606. For example, the host driver 512 executes a write command to store the data MMM from the low priority email application 508 to one of the flash-based storage devices in the flash-based storage array 514, even though the data MMM is low priority data and the flash-based storage array 514 includes only high priority storage devices. In another example, the host driver 512 executes a write command to store the data XXX received from the high priority database application 510 to one of the flash-based storage devices in the flash-based storage array 514.

Having received a write command to store a data chunk to a high priority storage device, the system 500 determines whether the identifier of a received data chunk is a duplicate of any of the identifiers corresponding to the stored data chunks that were previously stored in a high priority storage device, block 608. For example, the data storage system 504 determines whether a hash value H4 of the data MMM received from the low priority email application 508 matches any of the hash values of the data chunks that are already stored in one of the flash-based storage devices in the flash-based storage array 514. In another example, the data storage system 504 determines whether a hash value H1 of the data XXX received from the high priority database application 510 matches any of the hash values of the data chunks that are already stored in one of the flash-based storage devices in the flash-based storage array 514. If a received data chunk is a duplicate of any data chunk already stored by a high priority storage device, the flowchart 600 continues to block 610 to store, into a high priority storage device, the received data chunk as a reference to the duplicate data chunk already stored in a high priority storage device. If a received data chunk is not a duplicate of any data chunk already stored by a high priority storage device, the flowchart 600 proceeds to block 614 to store the received data chunk into a storage device.

If an application is low priority and if the identifier of a received data chunk is a duplicate of any of the identifiers corresponding to the data chunks that were previously stored in a high priority storage device, the system 500 stores, into a high priority storage device, the received data chunk as a low priority reference to the duplicate data chunk that is already stored in a high priority storage device, block 610. For example, the data storage system 504 stores, into one of the flash-based storage devices in the flash-based storage array 514, the data MMM received from the low priority email application 508 as a low priority reference to the previously stored data MMM that was already stored in one of the flash-based storage devices in the flash-based storage array 514, because the hash value H4 of the received data chunk MMM matches one of the hash values of the data chunks that are already stored in one of the flash-based storage devices in the flash-based storage array 514.

If an application is high priority and if the identifier of a received data chunk is a duplicate of any of the identifiers corresponding to the data chunks that were previously stored in a high priority storage device, the system 500 optionally stores, into a high priority storage device, the received data chunk as a high priority reference to the duplicate data chunk that is already stored in a high priority storage device, block 612. For example, the data storage system 504 stores, into one of the flash-based storage devices in the flash-based storage array 514, the data XXX received from the high priority database application 510 as a high priority reference to the previously stored data XXX that was already stored in one of the flash-based storage devices in the flash-based storage array 514, because the hash value H1 of the data XXX received from the high priority database application 510 matches one of the hash values of the high priority data chunks that are already stored in one of the flash-based storage devices in the flash-based storage array 514.

If an application is low priority and if the identifier of a received data chunk is a not duplicate of any of the identifiers corresponding to the data chunks that were previously stored in a high priority storage device, the system 500 optionally stores the received data chunk into a low priority storage device, block 614. For example, since the hash value H4 of the data MMM received from the low priority email application 508 did not match any of the hash values of the data chunks that are already stored in one of the flash-based storage devices in the flash-based storage array 514, then the data storage system 504 responds with a chk-cond message that rejects the write request, the host driver 512 executes a write command to store the data MMM to one of the rotating disk drives in the rotating disk storage array 516, and the data storage system 504 stores the received data MMM into one of the rotating disk drives in the rotating disk storage array 516.

If an application is high priority and if the identifier of a received data chunk is not a duplicate of any of the identifiers corresponding to the data chunks that are already stored in a high priority storage device, the system 500 optionally stores the data chunk into a high priority storage device, block 616. For example, the data storage system 504 stores the data XXX received from the high priority database application 510 into one of the flash-based storage devices in the flash-based storage array 514, because the hash value H1 of the data XXX received from the high priority database application 510 did not match any of the hash values of the data chunks that are already stored in one of the flash-based storage devices in the flash-based storage array 514.

Having stored a received data chunk into a storage device, the system 500 optionally determines whether a high priority reference count, that is associated with a high priority reference to an already stored data chunk, is reduced to zero, block 618. For example, the data storage system 504 determines if the high priority count of references to the data MMM that was previously stored in one of the flash-based storage devices in the flash-based storage array 514 has been reduced to zero. If a high priority reference count is reduced to zero, the flowchart 600 continues to block 624 to move the corresponding data chunk to a low priority storage device. If a high priority reference count is not reduced to zero, the flowchart 600 terminates.

If a high priority reference count, which is associated with a high priority reference to an already stored data chunk, is reduced to zero, the system 500 optionally stores the already stored data chunk into a low priority storage device, block 620. For example, the data storage system 504 stores the data MMM that is already stored in one of the flash-based storage devices in the flash-based storage array 514 into one of the rotating disk drives in the rotating disk storage array 516 because the high priority reference count for the data MMM is reduced to zero.

Having stored a data chunk, which was previously stored in a high priority storage device, into a low priority storage device, the system 500 optionally deletes the data chunk from the high priority storage device, block 622. For example, the data storage system 504 deletes the data MMM from one of the flash-based storage devices in the flash-based storage array 514.

Although FIG. 6 depicts the blocks 602-622 occurring in a specific order, the blocks 602-622 may occur in another order. In other implementations, each of the blocks 602-622 may also be executed in combination with other blocks and/or some blocks may be divided into a different set of blocks.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for efficiently storing low priority data in high priority storage devices, the system comprising:
a processor-based application, which when executed on a computer, will cause the processor to:
identify a priority level associated with an application in response to receiving a request from the application to store a data chunk received from the application, the data chunk received from the application being high priority data or low priority data based on the priority level associated with the application;
execute a write command to store the data chunk to a high priority storage device, the data chunk being high priority data or low priority data based on the priority level associated with the application;
determine whether an identifier of the received data chunk is a duplicate of any of a plurality of identifiers corresponding to a plurality of stored data chunks that were previously stored in the high priority storage device in response to executing the write command to store the data chunk to the high priority storage device; and
store, into the high priority storage device, the received data chunk as a low priority reference to a stored data chunk that was previously stored in the high priority storage device, in response to a determination that the application is low priority and a determination that the identifier of the received data chunk is the duplicate of any of the plurality of identifiers corresponding to the plurality of stored data chunks that were previously stored in the high priority storage device.

2. The system of claim 1, wherein the processor-based application further causes the processor to store the received data chunk into a low priority storage device in response to a determination that the application is low priority and a determination that the identifier of the received data chunk is not the duplicate of any of the plurality of identifiers corresponding to the plurality of stored data chunks that were previously stored in the high priority storage device.

3. The system of claim 1, wherein the processor-based application further causes the processor to store the received data chunk into the high priority storage device as a high priority reference to the stored data chunk, in response to a determination that the application is high priority and the determination that the identifier of the received data chunk is the duplicate of any of the plurality of identifiers corresponding to the plurality of stored data chunks that were previously stored in the high priority storage device.

4. The system of claim 1, wherein the processor-based application further causes the processor to store the received data chunk into the high priority storage device in response to a determination that the application is high priority and a determination that the identifier of the received data chunk is not the duplicate of any of the plurality of identifiers corresponding to the plurality of stored data chunks that were previously stored in the high priority.

5. The system of claim 3, wherein the processor-based application further causes the processor to:

determine whether a high priority reference count that is associated with the high priority reference to the stored data chunk is reduced to zero;

store the stored data chunk into a low priority storage device in response to the determination that the high priority reference count is reduced to zero; and delete the stored data chunk from the high priority storage device.

6. The system of claim 1, wherein the identifier of the received data chunk comprises a hash value based on applying a hash function to the received data chunk.

7. The system of claim 2, wherein the high priority storage device comprises a flash-based storage device and the low priority storage device comprises a rotating disk drive.

8. A computer-implemented method for efficiently storing low priority data in high priority storage devices, the method comprising:

identifying a priority level associated with an application in response to receiving a request from the application to store a data chunk received from the application, the data chunk received from the application being high priority data or low priority data based on the priority level associated with the application;

executing a write command to store the data chunk to a high priority storage device, the data chunk being high priority data or low priority data based on the priority level associated with the application;

determining whether an identifier of the received data chunk is a duplicate of any of a plurality of identifiers corresponding to a plurality of stored data chunks that were previously stored in the high priority storage device in response to executing the write command to store the data chunk to the high priority storage device; and storing, into the high priority storage device, the received data chunk as a low priority reference to a stored data chunk that was previously stored in the high priority storage device, in response to a determination that the application is low priority and a determination that the identifier of the received data chunk is the duplicate of any of the plurality of identifiers corresponding to the plurality of stored data chunks that were previously stored in the high priority storage device.

9. The method of claim 8, wherein the method further comprises storing the received data chunk into a low priority storage device in response to a determination that the application is low priority and a determination that the identifier of the received data chunk is not the duplicate of any of the plurality of identifiers corresponding to the plurality of stored data chunks that were previously stored in the high priority storage device.

10. The method of claim 8, wherein the method further comprises storing the received data chunk into the high priority storage device as a high priority reference to the stored data chunk, in response to a determination that the application is high priority and the determination that the identifier of the received data chunk is the duplicate of any of the plurality of identifiers corresponding to the plurality of stored data chunks that were previously stored in the high priority storage device.

11. The method of claim 8, wherein the method further comprises storing the received data chunk into the high priority storage device in response to a determination that the application is high priority and a determination that the identifier of the received data chunk is not the duplicate of any of the plurality of identifiers corresponding to the plurality of stored data chunks that were previously stored in the high priority.

12. The method of claim 10, wherein the method further comprises:

determining whether a high priority reference count that is associated with the high priority reference to the stored data chunk is reduced to zero;

storing the stored data chunk into a low priority storage device in response to the determination that the high priority reference count is reduced to zero; and deleting the stored data chunk from the high priority storage device.

13. The method of claim 8, wherein the identifier of the received data chunk comprises a hash value based on applying a hash function to the received data chunk.

14. The method of claim 9, wherein the high priority storage device comprises a flash-based storage device and the low priority storage device comprises a rotating disk drive.

15. A computer program product, comprising a non-transitory computer-readable medium having a computer-readable program code embodied therein to be executed by one or more processors, the program code including instructions to:

identify a priority level associated with an application in response to receiving a request from the application to store a data chunk received from the application, the data chunk received from the application being high priority data or low priority data based on the priority level associated with the application;

execute a write command to store the data chunk to a high priority storage device, the data chunk being high priority data or low priority data based on the priority level associated with the application;

determine whether an identifier of the received data chunk is a duplicate of any of a plurality of identifiers corresponding to a plurality of stored data chunks that were previously stored in the high priority storage device in response to executing the write command to store the data chunk to the high priority storage device; and store into the high priority storage device, the received data chunk as a low priority reference to a stored data chunk that was previously stored in the high priority storage device, in response to a determination that the application is low priority and a determination that the identifier of the received data chunk is the duplicate of any of the plurality of identifiers corresponding to the plurality of stored data chunks that were previously stored in the high priority storage device.

16. The computer program product of claim 15, wherein the program code includes further instructions to store the received data chunk into a low priority storage device in response to a determination that the application is low priority and a determination that the identifier of the received data chunk is not the duplicate of any of the plurality of identifiers corresponding to the plurality of stored data chunks that were previously stored in the high priority storage device.

17. The computer program product of claim 15, wherein the program code includes further instructions to store the received data chunk into the high priority storage device as a high priority reference to the stored data chunk, in response to a determination that the application is high priority and the determination that the identifier of the received data chunk is the duplicate of any of the plurality of identifiers corresponding to the plurality of stored data chunks that were previously stored in the high priority storage device.

18. The computer program product of claim 15, wherein the program code includes further instructions to store the received data chunk into the high priority storage device in response to a determination that the application is high priority and a determination that the identifier of the received data chunk is not the duplicate of any of the plurality of identifiers corresponding to the plurality of stored data chunks that were previously stored in the high priority.

19. The computer program product of claim 17, wherein the program code includes further instructions to:
- determine whether a high priority reference count that is associated with the high priority reference to the stored data chunk is reduced to zero;
- store the stored data chunk into a low priority storage device in response to the determination that the high priority reference count is reduced to zero; and
- delete the stored data chunk from the high priority storage device.

20. The computer program product of claim 16, wherein the identifier of the received data chunk comprises a hash value based on applying a hash function to the received data chunk, the high priority storage device comprises a flash-based storage device, and the low priority storage device comprises a rotating disk drive.

* * * * *